United States Patent
Ghosh et al.

(10) Patent No.: US 9,563,473 B2
(45) Date of Patent: *Feb. 7, 2017

(54) CONCURRENT WORKLOAD DEPLOYMENT TO SYNCHRONIZE ACTIVITY IN A DESIGN PALETTE

(71) Applicant: International Business Machines Corporation, Armonk, NY (US)

(72) Inventors: Rahul Ghosh, Morrisville, NC (US); Hugh E. Hockett, Raleigh, NC (US); Aaron J. Quirk, Cary, NC (US); Lin Sun, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/822,406

(22) Filed: Aug. 10, 2015

(65) Prior Publication Data

US 2016/0162339 A1 Jun. 9, 2016

Related U.S. Application Data (63) Continuation of application No. 14/560,615, filed on Dec. 4, 2014.

(51) Int. Cl.
 *G06F 9/48* (2006.01)
 *G06F 9/50* (2006.01)
(52) U.S. Cl.
 CPC .......... *G06F 9/4887* (2013.01); *G06F 9/4881* (2013.01); *G06F 9/5083* (2013.01)

(58) Field of Classification Search
None
See application file for complete search history.

(56) References Cited

U.S. PATENT DOCUMENTS

| | | | |
|---|---|---|---|
| 2005/0268299 A1* | 12/2005 | Picinich | G06F 9/485 718/100 |
| 2011/0295984 A1* | 12/2011 | Kunze | G06F 8/62 709/220 |
| 2013/0297964 A1* | 11/2013 | Hegdal | G06F 11/0712 714/2 |
| 2014/0344457 A1* | 11/2014 | Bruno, Jr. | A63F 13/12 709/226 |

(Continued)

OTHER PUBLICATIONS

List of IBM Patents or Patent Applications Treated as Related; (Appendix P), Filed Aug. 10; 2 pages.

(Continued)

*Primary Examiner* — Abdullah Al Kawsar
*Assistant Examiner* — Jorge A Chu Joy-Davila
(74) *Attorney, Agent, or Firm* — Cantor Colburn LLP; Nicholas Bowman (57) ABSTRACT

A system and method for iteratively deploying a workload pattern are provided. The system and method determines a current set of requirements for at least one piece of the workload pattern that is initiated in a designer and generates a stability metric for at least one of the current set of requirements. The system and method further compares the stability metric to an acceptance threshold and calculates an estimated time to deploy the at least one piece of the workload pattern based on the comparing of the stability metric to the acceptance threshold.

8 Claims, 6 Drawing Sheets

Process Flow 100

(56) References Cited

U.S. PATENT DOCUMENTS

2015/0135176 A1* 5/2015 Kruglick ............ G06F 9/45533
                                                             718/1

OTHER PUBLICATIONS

Rahul Ghosh, et al., "Concurrent Workload Deployment to Synchronize Activity in a Design Palette", U.S. Appl. No. 14/560,615, filed Dec. 4, 2014.

* cited by examiner

CONCURRENT WORKLOAD DEPLOYMENT TO SYNCHRONIZE ACTIVITY IN A DESIGN PALETTE

DOMESTIC PRIORITY

This application is a continuation of U.S. application Ser. No. 14/560,615, filed on Dec. 4, 2014, the disclosure of which is incorporated by reference herein in its entirety.

BACKGROUND

The present disclosure relates generally to a concurrent workload deployment to synchronize activity in design palette, and more specifically, to a management system configured to partially deploy into an operation environment pieces of an application workload concurrent to a designing of the application workload topology in an editor.

In general, there is a need in cloud environments to provision virtual machines and application workloads as fast as possible. Yet, while the provisioning of virtual machines and application workloads may be optimized via containers, thin-provisioning, and multi-tenant technologies, the provisioning of thick-provision virtual machines presently take longer to deploy.

SUMMARY

Embodiments include a method, system, and computer program product for iteratively deploying a workload pattern that comprises determining a current set of requirements for at least one piece of the workload pattern, the workload pattern being initiated in a designer; generating a stability metric for at least one of the current set of requirements; comparing the stability metric to an acceptance threshold; and
calculating an estimated time to deploy the at least one piece of the workload pattern based on the comparing of the stability metric to the acceptance threshold.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein relate to a management system (e.g., implemented via a system, a method, and/or computer program product) configured to partially deploy into an operation environment pieces of an application workload concurrent to a designing of the application workload topology in an editor. The management system enables a confidence metric for a stability of tiers of the application workload (or workload pattern) to determine an ideal time to deploy pieces/components or provision portions of that workload pattern, along with providing an estimated time to availability as changes are made to the workload pattern. In this way, the management system optimizes a number of alterations or churns to the operation environment, so that only components of the workload pattern that are changed and/or more likely to stay in the operation environment are redeployed, rather than redeploying transient components of the workload pattern.

Figure 1:
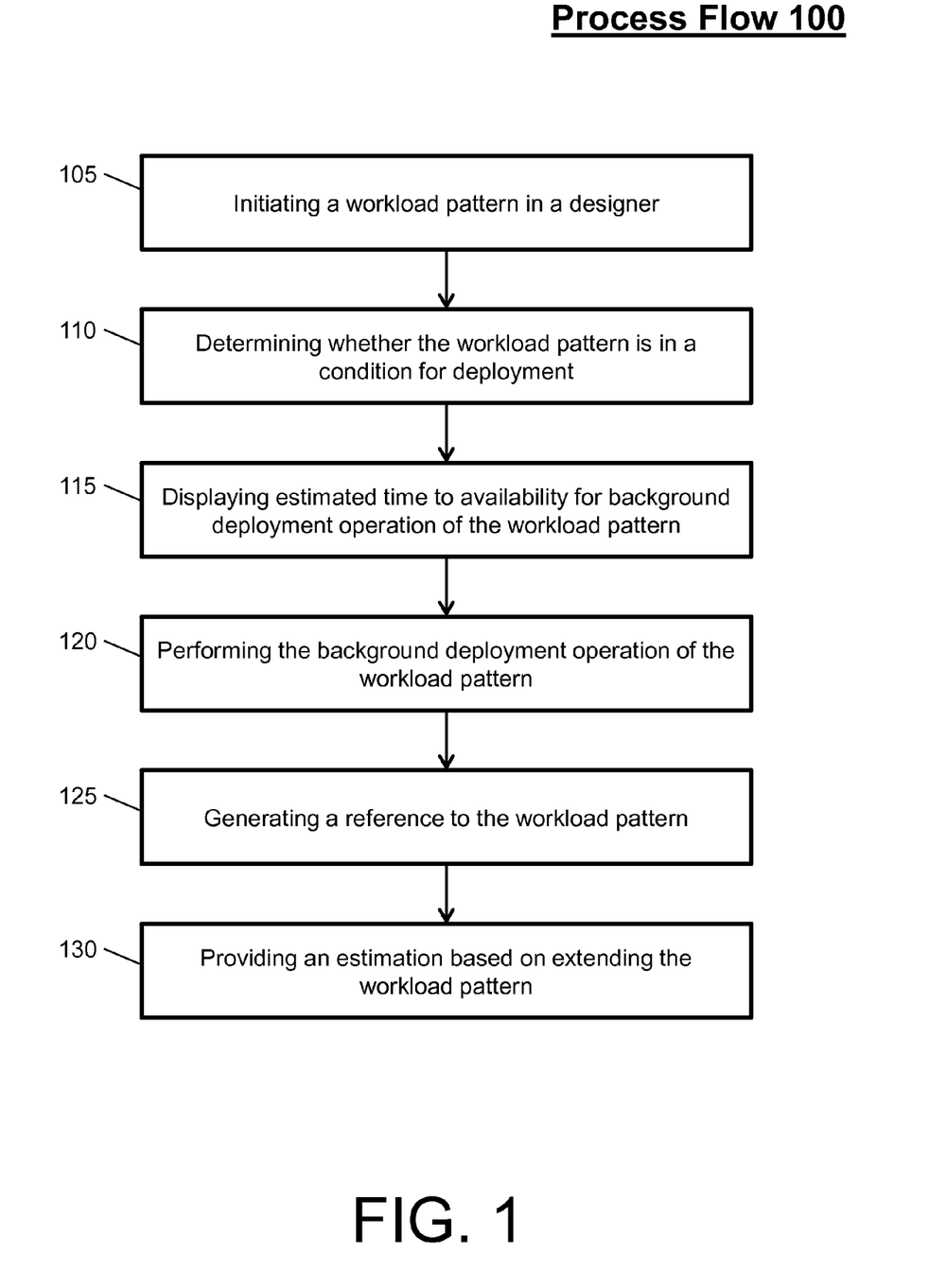
FIG. 1 illustrates a process flow in accordance with an embodiment.

Referring now to FIG. 1, a process flow 100 that describes an optimization by the management system of deploying a workload pattern into an operation environment according to one embodiment is illustrated. The process flow 100 begins at block 105, where the workload pattern in an editor or designer is initiated.

For example, a workload pattern can be created and/or edited (by a user) in the designer that is at least part of the management system, which further operates in alongside or within the operation environment (e.g., a cloud environment as further described below with respect to FIG. 4, FIG. 5, and FIG. 6). The operation environments include configurable aspect, such as components, virtual machines, virtual images, applications, middleware, sub-routines, and the like. A workload pattern (or application workload) is architectural blueprint and scheme that details a design, build, and/or management these aspects. In turn, the designer of the management system is a pattern interface that allows users, through a visual design palette, to design and define topologies of virtual images, middleware, application roles, etc. within a workload pattern and then deploy components of that workload pattern or the workload pattern itself.

Once the workload pattern is initiated, the management system determines, at block 110, whether the workload pattern is in a condition for deployment. That is, to reduce the number of churns, the management system determines a stability of a particular component of the workload pattern and/or the workload pattern itself. Then, based on its stability, the management system determines whether that particular component or the entire workload pattern itself is in condition for deployment in the operation environment. The determination of block 110 of the process flow 100 will now be described with respect to FIG. 2.

Figure 2:
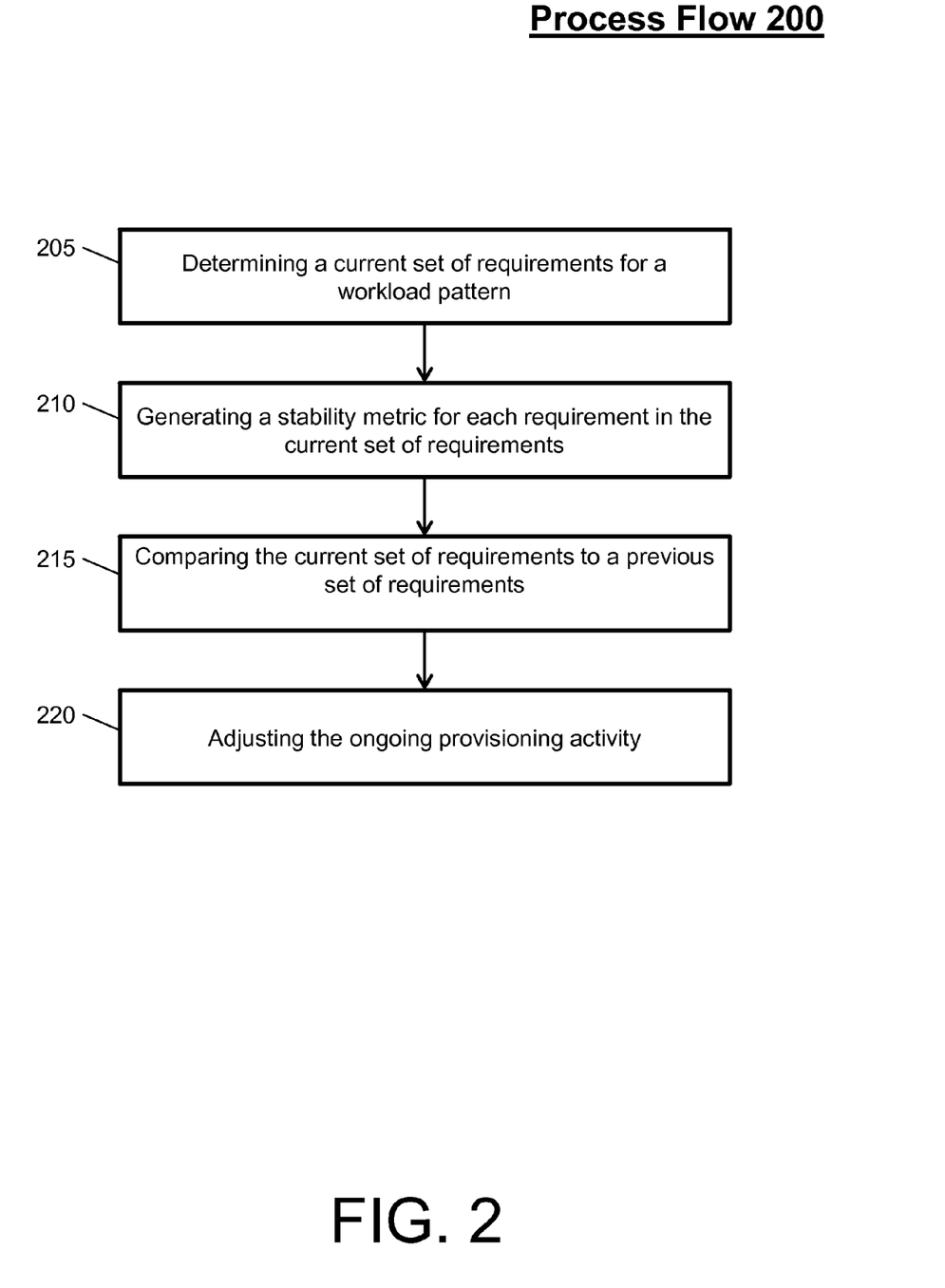
FIG. 2 illustrates a process flow in accordance with an embodiment.

FIG. 2 illustrates a process flow 200, where at block 205 the management system determines a current set of requirements for the workload. This determination can be in response to, for example, a save operation processed by the management system and/or an asynchronous time interval. The current set of requirements can include but are not limited to assets of base operating system images required for the workload pattern (e.g., a common version of an operating system is being used in the workload pattern by a plurality of components); resources assigned to base operating system instances; connectivity relationships between base operating system instances; operating system configuration parameters; operating system software dependencies; middleware requirements; middleware relationships and connections (e.g., datasource connections for databases, etc.); user application binaries; and user application configurations.

At block 210, the management system generates stability metrics for the current set of requirements. That is, the management system generates a tier stability metric for each item in the current set of requirements to optimize a churn and prioritize a deployment order for the components of the workload pattern (e.g., the stable components with the higher tier stability metric can be deployed before those with a lower tier stability metric). The tier stability metric can be based on tier dependency level; time since the last modification (e.g., number of iterations observed on the same component); focus on a specific component in the workload pattern that is currently being modified; typical and historical flows for modifications of the workload pattern (e.g. the way users typically start modifications of the workload pattern by starting first with the base operating system image, moving to script packages and add-ons, etc.); time required to execute modifications to the tier; etc. In addition, at block 210, the management system can apply inputs to an expression that produces a quantitative value from 0 to 1 for each tier stability metric, where 1 is a high stability and 0 is low stability.

For example, with respect to tier dependency level, the management system can monitor a dependency tree of a stack of the workload pattern, determine how many components of the stack are utilized by particular component, and issue a score corresponding to that utilization for the particular component. Therefore, if a component of the workload pattern is a common dependent of many components of the stack, that component will receive a higher score for stability than a component of the workload pattern that is not a common dependent (e.g., modifications to an operating system require more confidence than modification to user application binaries).

Further, with respect to time since the last modification, the management system can monitor a time since a component of the workload pattern was changed or loaded into the workload pattern. In this way, where a component with a longer the life in the workload pattern would receive a higher score for stability than a component with a shorter life. For example, if an application was loaded onto the workload pattern and its lifespan without a change is three minutes, then that application will have a higher stability than an application that has a lifespan of three seconds (e.g., its tier stability metric would be closer to 1 than the application with the three second lifespan).

At block 215, the management system compares the current set of requirements to a previous set of requirements. The comparison of block 215 of the process flow 200 will now be described with respect to FIG. 3.

Figure 3:
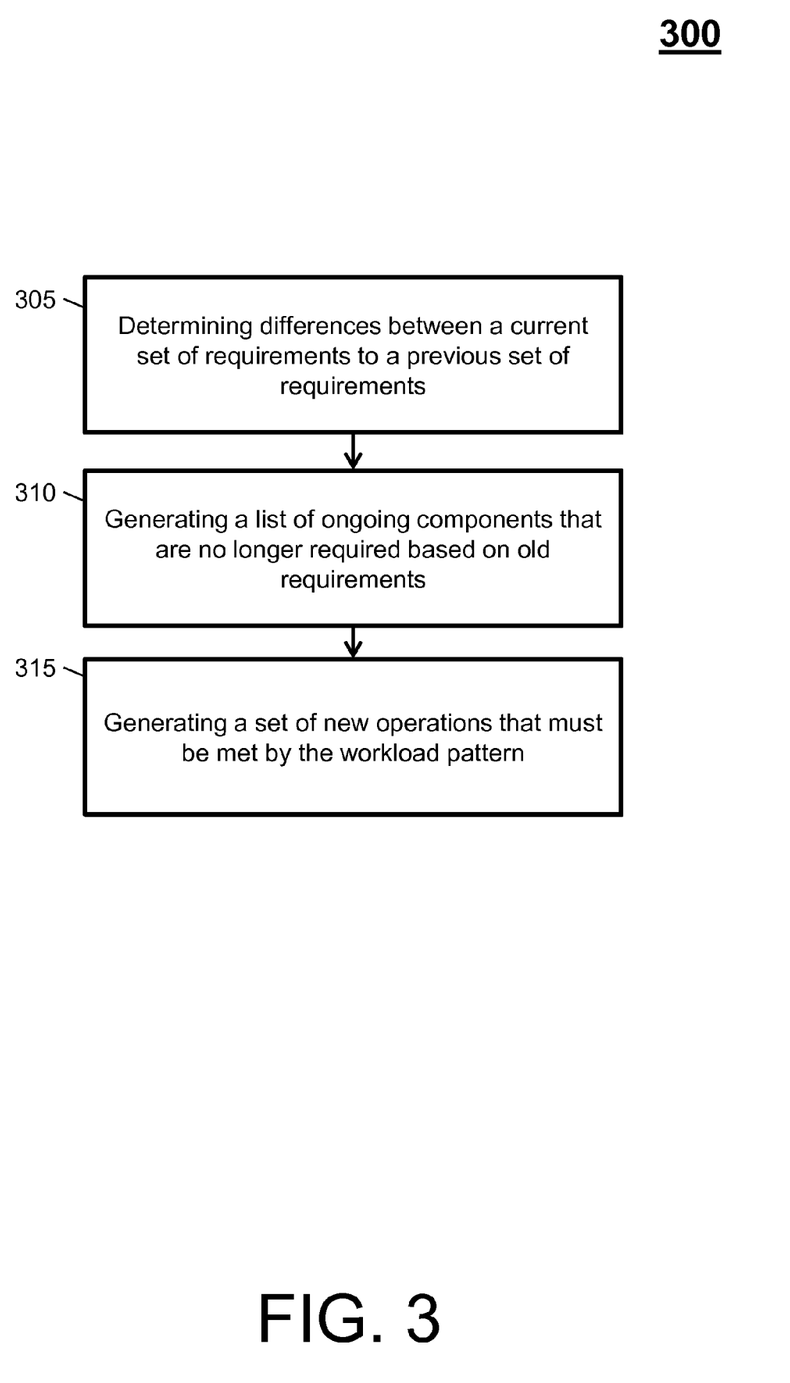
FIG. 3 illustrates a process flow in accordance with an embodiment.

FIG. 3 illustrates a process flow 300, where at block 305 the management system determines differences between the current set of requirements to a previous set of requirements. For example, the management system can determine what differences exist with respect to the last time the requirements were calculated (e.g., any delta between a configurations) by iterating previous requirements; discarding requirements that have not changed; identifying old requirements (e.g., requirement that are no longer present in new set); and/or identifying new requirements (e.g., determine whether a requirement was present in old set).

At block 310, the management system generates a list of ongoing components that are no longer required based on old requirements. For instance, the management system can generate a list of ongoing applications that are no longer required (old requirements) in accordance with the determination of differences between the current and the previous requirements.

At block 315, the management system generates a set of new operations that must be met by the workload pattern. In an embodiment, the management system generates a set of new operations based on the tier stability metric generated in the process flow 200 and compared to acceptance threshold. For example, if stability is greater than or equal to an acceptance threshold of N (e.g., where N is equal to 0.75), the operation is considered stable enough to begin provisioning. Further, in the embodiment, the management system adds tasks for each requirement and/or adds tasks to reverse old requirements that are no longer valid, as determined at block 310.

Returning to FIG. 2, the process flow 200 continues to block 220, where the management system adjusts the ongoing provisioning activity, such as by canceling operations in-flight that are no longer required and/or executing a set of delta operations.

Returning to FIG. 1, at block 115, the management system displays an estimated time to availability for background deployment operation of the workload pattern. In an embodiment, designer of the management system is presented as an interface on a display, where the interface further presents an estimated time to availability for the background deployment operation. The estimated time to availability may be presented as an icon, a countdown timer, a logo, a progress bar and/or a combination of thereof. The estimated time to availability can be based on aggregated estimated time for items and/or components to complete, and can dynamically change to reflect modifications to items and/or components.

At block 120, the management system performs the background deployment operation of the workload pattern. For example, if the management system receives an indication (e.g., a user input) to deploy a completed workload pattern, the management system can wait for ongoing provisioning operations to complete (or ideally they may already be complete); migrate the existing pattern to intended location; and apply specified instance configuration values to the existing instance. Specified instance configuration values include but are not limited to network information (e.g., IP address, VLAN, etc.), authentication data (e.g., username, password, tokens, etc.), and resource modifications (e.g., changes to disks, processors, memory, etc.).

At block 125, the management system generates a reference to the workload pattern. The reference identifies the workload pattern.

At block 130, the management system provides estimations based on extending the workload pattern. That is, when the existing pattern is extended (or contracted), the management system provides an estimation of how the current deployment time will be affected. For example, if an extension is an addition of a virtual machine independent from the rest of the virtual machines in the workload pattern, then the provisioning time will increase if the additional virtual machine provisioning time is maximum across all virtual machines. Further, if an extension is an addition of a virtual machine independent from the rest of the virtual machines in the workload pattern, then the provisioning time will remain nearly the same if new virtual machine provisioning time is less than the longest provisioning of one of those existing virtual machines. Furthermore, if an extra script package is added to a virtual machine, a run-time of script is taken into consideration.

The present invention may be a system (e.g., implemented on a cloud computing environment), a method, and/or a computer program product. Further, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

The computer program product may include a computer readable storage medium (or media) having computer readable program instructions thereon for causing a processor to carry out aspects and/or embodiments of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With respect to implementing aspect and/or embodiments of the present invention on cloud computing environment, cloud computing in general is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics can be on-demand self-service; broad network access; resource pooling; rapid elasticity; and measured service.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Three service models can include Software as a Service (SaaS); Platform as a Service (PaaS); and Infrastructure as a Service (IaaS).

SaaS: the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

PaaS: the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

IaaS: the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The deployment models can include private cloud; community cloud, public cloud; and hybrid cloud.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
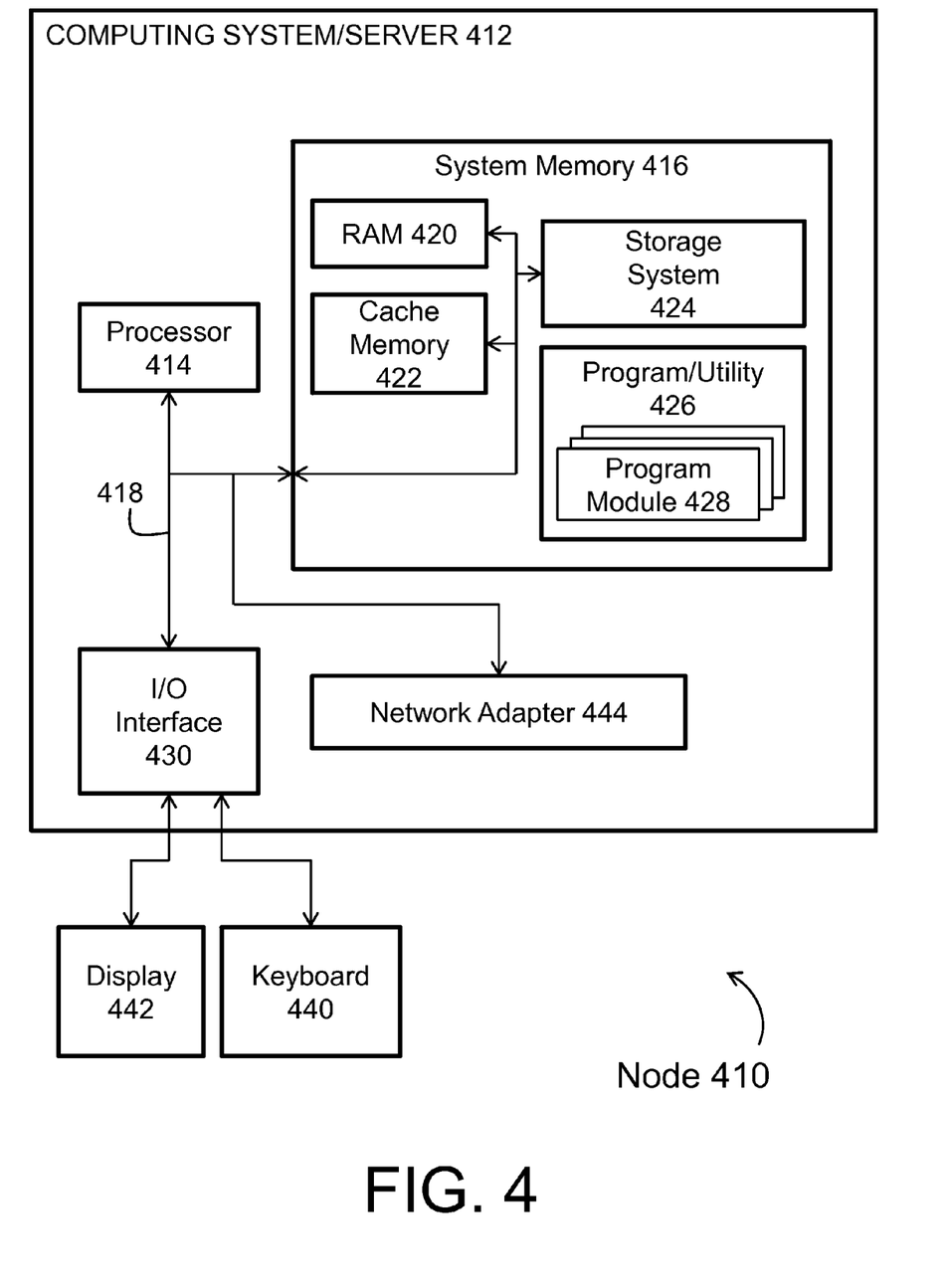
FIG. 4 depicts a cloud computing node according to an embodiment of the present invention.

Referring now to FIG. 4, a schematic of an example of a cloud computing node is shown. A cloud computing node 410 is only one example of a suitable cloud computing node and is not intended to suggest any limitation as to the scope of use or functionality of embodiments of the invention described herein. Regardless, the cloud computing node 410 is capable of being implemented and/or performing any of the functionality set forth hereinabove.

In the cloud computing node 410 there is a computer system/server 412, which is operational with numerous other general purpose or special purpose computing system environments or configurations. Examples of well-known computing systems, environments, and/or configurations that may be suitable for use with the computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server 412 may be described in the general context of computer system executable instructions, such as program modules, being executed by a computer system. Generally, program modules may include routines, programs, objects, components, logic, data structures, and so on that perform particular tasks or implement particular abstract data types. The computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, the computer system/server 412 in the cloud computing node 410 is shown in the form of a general-purpose computing device. The components of the computer system/server 412 may include, but are not limited to, one or more processors or processing units (e.g., processor 414), a system memory 416, and a bus 418 that couples various system components including the system memory 416 to the processor 414.

The bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system/server 412 typically includes a variety of computer system readable media. Such media may be any available media that is accessible by the computer system/server 412, and it includes both volatile and non-volatile media, removable and non-removable media.

The system memory 416 can include computer system readable media in the form of volatile memory, such as a random access memory (RAM) 420 and/or a cache memory 422. The computer system/server 412 may further include other removable/non-removable, volatile/non-volatile computer system storage media. By way of example only, storage system 424 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 418 by one or more data media interfaces. As will be further depicted and described below, the system memory 416 may include at least one program product having a set (e.g., at least one) of program modules that are configured to carry out the functions of embodiments of the invention.

For example, a program/utility 426, having a set (at least one) of program modules (e.g., a program module 428), may be stored in the system memory 416 by way of example, and not limitation, as well as an operating system, one or more application programs, other program modules, and program data. Each of the operating system, one or more application programs, other program modules, and program data or some combination thereof, may include an implementation of a networking environment. The program modules 426 generally carry out the functions and/or methodologies of embodiments of the invention as described herein.

The computer system/server 412 may also communicate (e.g., via Input/Output (I/O) interfaces, such as I/O interface 430) with one or more external devices, such as a keyboard 440, a pointing device, a display 442, etc.; one or more devices that enable a user to interact with the computer system/server 412; and/or any devices (e.g., network card, modem, etc.) that enable the computer system/server 412 to communicate with one or more other computing devices. Still yet, the computer system/server 412 can communicate with one or more networks such as a local area network (LAN), a general wide area network (WAN), and/or a public network (e.g., the Internet) via a network adapter 444. As depicted, the network adapter 444 communicates with the other components of the computer system/server 412 via the bus 418. It should be understood that although not shown, other hardware and/or software components could be used in conjunction with the computer system/server 412. Examples, include, but are not limited to: microcode, device drivers, redundant processing units, external disk drive arrays, RAID systems, tape drives, and data archival storage systems, etc.

Figure 5:
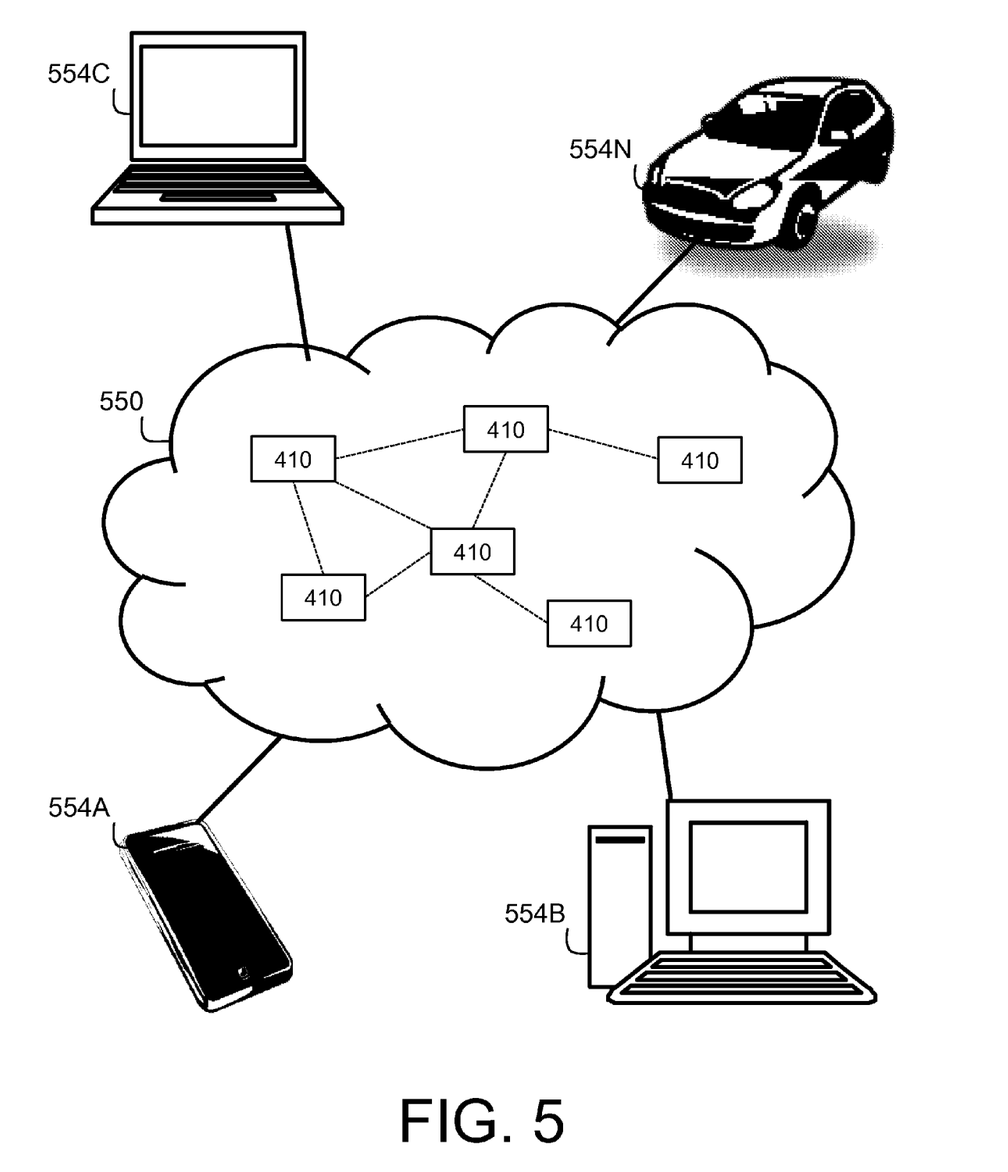
FIG. 5 depicts a cloud computing environment according to an embodiment of the present invention.

Referring now to FIG. 5, illustrative cloud computing environment 550 is depicted. As shown, the cloud computing environment 550 comprises one or more cloud computing nodes 410 with which local computing devices used by cloud consumers, such as, for example, a personal digital assistant (PDA) or cellular telephone 554A, a desktop computer 554B, a laptop computer 554C, and/or an automobile computer system 554N may communicate. The cloud computing nodes 410 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that the computing nodes 410 and cloud computing environment 550 can communicate with any type of computerized device over any type of network and/or network addressable connection (e.g., using a web browser).

Figure 6:
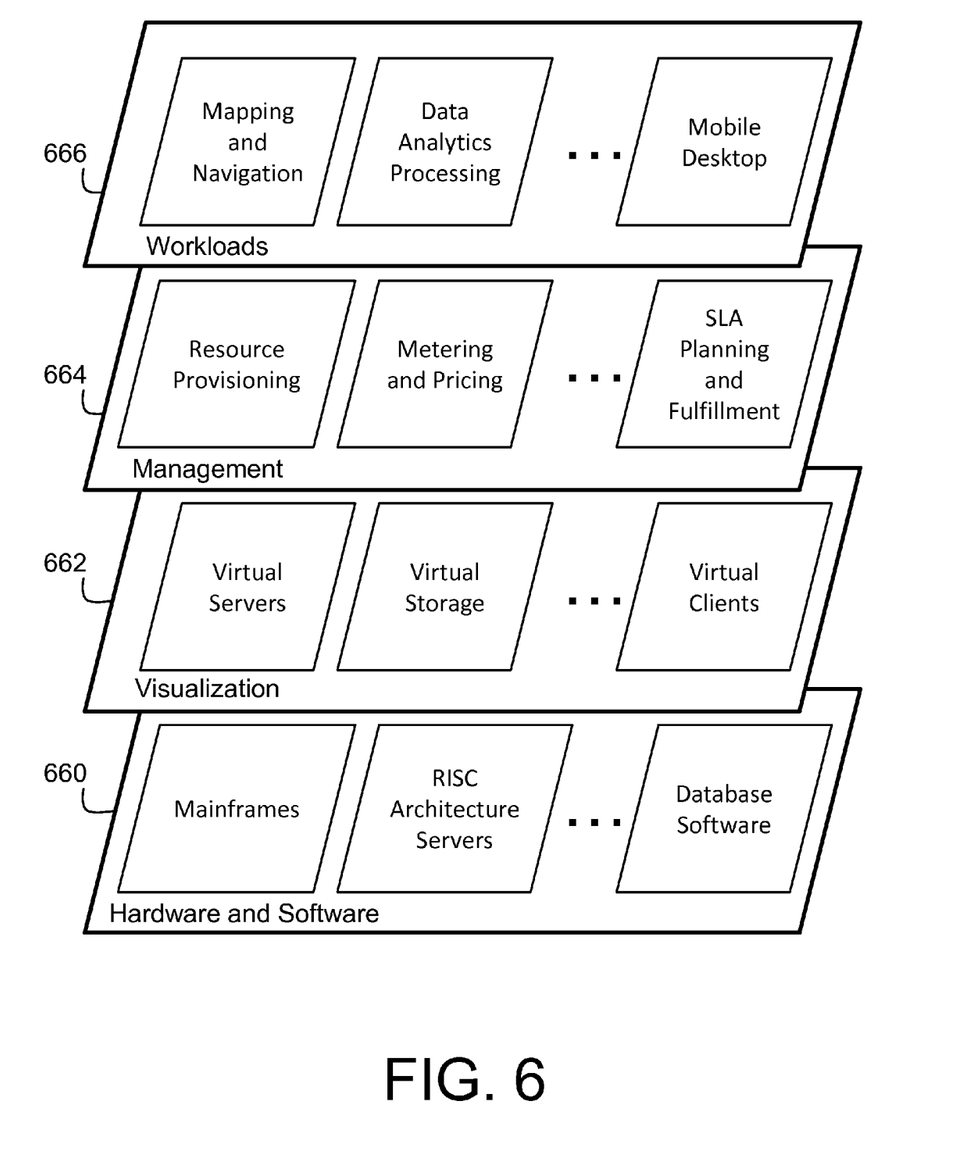
FIG. 6 depicts abstraction model layers according to an embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

A hardware and software layer 660 includes hardware and software components. Examples of hardware components include: mainframes; RISC (Reduced Instruction Set Computer) architecture based servers; storage devices; networks and networking components. In some embodiments, software components include network application server software.

A virtualization layer 662 provides an abstraction layer from which the following examples of virtual entities may be provided: virtual servers; virtual storage; virtual networks, including virtual private networks; virtual applications and operating systems; and virtual clients.

In one example, a management layer 664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators.

Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

A workloads layer 666 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

In view of the above, the management system improves deployment use cases for creating new workload patterns or making changes to existing patterns in that as interactions with a pattern in a designer of the management system occur, deployment of the pattern are executed in parallel based on a current state of the pattern. Further, adjustments to any deployed instance of the pattern can occur as continued changes are made in the designer, while visual representation indicate the status of the deployed instances and the pattern in the designer. Thus, the technical effects and benefits of the management system include concurrent provisioning of a workload pattern during design; providing confidence metrics quantifying a stability of a workload tier or component of a workload pattern during design; providing estimated times to availability of deployed instances as modifications are made to a workload pattern during design; providing estimations as to how provisioning time will be changed without actually putting changes in place when existing workload patterns are extended; and displaying potential run time errors workload pattern during design. Technical effects and benefits of the management system also include optimizing provisioning time of complex application workloads; reducing time to value; improving problem determination and speed; improve user first impression of cloud management experience; and increasing effectiveness of management system for development and operations paradigms.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for iteratively deploying a workload pattern comprising a plurality of pieces, by a processor, the method comprising:

determining, by the processor, a current set of requirements for at least one piece of the workload pattern, the workload pattern being initiated by a user in a designer;

generating, by the processor, a stability metric for each item in the current set of requirements of the at least one piece of the workload pattern, the stability metric evaluating a plurality of conditions including at least one condition selected from a group consisting of a tier dependency level of the pieces of the workload pattern and a time since last modification of the workload pattern by the user, the stability metric comprising a quantitative value indicating a stability of the at least one piece of the workload pattern with respect to an ideal time to deploy the at least one piece of the workload pattern;

comparing, by the processor, the stability metric to an acceptance threshold;

calculating, by the processor, an estimated time to deploy the at least one piece of the workload pattern when the comparing of the stability metric to the acceptance threshold indicates that a stability of the at least one piece of the workload pattern is greater than or equal to the acceptance threshold; and performing a deployment operation of the at least one piece of the workload pattern based on the calculated estimated time to deploy.

2. The method of claim 1, wherein the determining of the current set of requirements is in response to a save operation or an asynchronous time interval.

3. The method of claim 1, further comprising:
performing a background deployment operation on the at least one piece of the workload pattern at a conclusion of the estimated time to deploy, the background deployment operation configured to deploy the at least one piece of the workload pattern into an operation environment.

4. The method of claim 1, wherein the stability metric is based on at least one of a tier dependency level or a time since the last modification.

5. The method of claim 1, further comprising:
detecting an extension to the workload pattern; and
adjusting the estimated time to deploy to incorporate any additional provisioning time of the extension.

6. The method of claim 1, further comprising:
presenting, via the designer, an indication of the estimated time to deploy.

7. The method of claim 1, wherein the stability metric is one of a plurality of tier stability metrics,
wherein the at least one piece of the workload pattern is included in a plurality of workload pattern components,
each of the plurality of tier stability metrics corresponds to an item in the current set of requirements and is utilized to optimize a churn and prioritize a deployment order for the plurality of workload pattern components.

8. The method of claim 5, wherein when the extension is an addition of a new virtual machine independent from current virtual machines in the workload pattern, then a provisioning time of the workload pattern increases if a provisioning time of the additional virtual machine is maximum across the new and current virtual machines or the provisioning time of the workload pattern remains if the provisioning time of new virtual machine is less than a longest provisioning time of one of the current virtual machines.

* * * * *